US011993287B2

(12) United States Patent
Vogt et al.

(10) Patent No.: US 11,993,287 B2
(45) Date of Patent: May 28, 2024

(54) FLEET-LEVEL AV SIMULATION SYSTEM AND METHOD (71) Applicant: GM Cruise Holdings LLC, San Francisco, CA (US)

(72) Inventors: Kyle Vogt, San Francisco, CA (US); Thomas Busser, San Francisco, CA (US); Benjamin Dunkin, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 98 days.

(21) Appl. No.: 17/244,519

(22) Filed: Apr. 29, 2021

(65) Prior Publication Data
US 2022/0348232 A1 Nov. 3, 2022

(51) Int. Cl.
*B60W 60/00* (2020.01)
*G01C 21/00* (2006.01)
*G01C 21/34* (2006.01)
*G05D 1/00* (2006.01)
*G07C 5/02* (2006.01)

(52) U.S. Cl.
CPC ..... *B60W 60/0023* (2020.02); *G01C 21/3469* (2013.01); *G01C 21/3822* (2020.08); *G05D 1/0217* (2013.01); *G05D 1/0291* (2013.01); *G07C 5/02* (2013.01); *B60W 2552/15* (2020.02)

(58) Field of Classification Search
CPC .......... B60W 60/0023; B60W 2552/15; G01C 21/3822; G01C 21/3469; G01D 1/0217; G05D 1/0291; G07C 5/02; G08G 1/202; G06Q 10/04
See application file for complete search history.

(56) References Cited

U.S. PATENT DOCUMENTS 8,825,403 B1* 9/2014 Kadous ................ G01C 21/32
701/527
2012/0072049 A1* 3/2012 Haaf ....................... G01D 4/00
701/1

(Continued)

FOREIGN PATENT DOCUMENTS

GB 2448972 * 11/2008

OTHER PUBLICATIONS

Sanchez, Juan-Carlos, Dongkyun, Kim, "Predicting Traffic Lights to Improve Urban Traffic Fuel Consumption", 6th International Conference on ITS Telecommunications Proceedings, 2006 (Year: 2006).*

*Primary Examiner* — Vivek D Koppikar
*Assistant Examiner* — Godfrey Aleksander Maciorowski (57) ABSTRACT The subject disclosure relates to techniques for optimizing autonomous vehicle activities at a fleet level. A process of the disclosed technology can include measuring a first set of cost metrics for a first plurality of autonomous vehicles (AVs) associated with a first vehicle routing version, wherein the first set of cost metrics comprises energy consumption values for two or more of the first plurality of AVs, measuring a second set of cost metrics for a second plurality of AVs associated with a second vehicle routing version, wherein the second set of cost metrics comprises energy consumption values for two or more of the second plurality of AVs, and comparing the first set of cost metrics with the second set of cost metrics to determine routing updates configured to reduce fleetwide energy consumption.

15 Claims, 5 Drawing Sheets (56) References Cited

U.S. PATENT DOCUMENTS

2016/0257295 A1\* 9/2016 Miller ............... B60W 50/0097
2019/0011931 A1\* 1/2019 Selvam ................. G08G 1/202
2021/0031803 A1\* 2/2021 Cussigh ............. B60W 50/082

\* cited by examiner

FLEET-LEVEL AV SIMULATION SYSTEM AND METHOD

BACKGROUND

1. Technical Field

The subject technology provides solutions for simulating and optimizing operations of autonomous vehicles and in particular for simulating and optimizing operations of autonomous vehicles at a fleet level.

2. Introduction

Autonomous vehicles operate without human drivers. As autonomous vehicles navigate streets, the autonomous vehicles are unable to determine how to maximize various metrics, causing inefficiencies. These inefficiencies are exacerbated when the autonomous vehicles are in an autonomous vehicle fleet.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

One autonomous vehicle traversing streets of a geographical region can be inefficient based on request pick-up locations, drop-off locations, routes or streets taken, positions of charging and/or maintenance facilities, etc. This problem is further exacerbated and can become incredibly inefficient when spread across multiple autonomous vehicles in an autonomous vehicle fleet. For example, a fleet of autonomous vehicles can include over a thousand autonomous vehicles even within a geographical region of a metropolitan city. Furthermore, obtaining this data can be incredibly time-consuming. For example, a single trip for one autonomous vehicle can last anywhere from minutes to hours, and in some cases even days. Thus, there is a need in the art to optimize for autonomous vehicle activity, particularly across an entire fleet of autonomous vehicles.

The present technology provides solutions for simulating autonomous vehicle operations at a fleet level and, from the data collected in simulations, provide actionable metrics to optimize for activities of autonomous vehicles and fleets of autonomous vehicles.

Figure 1:
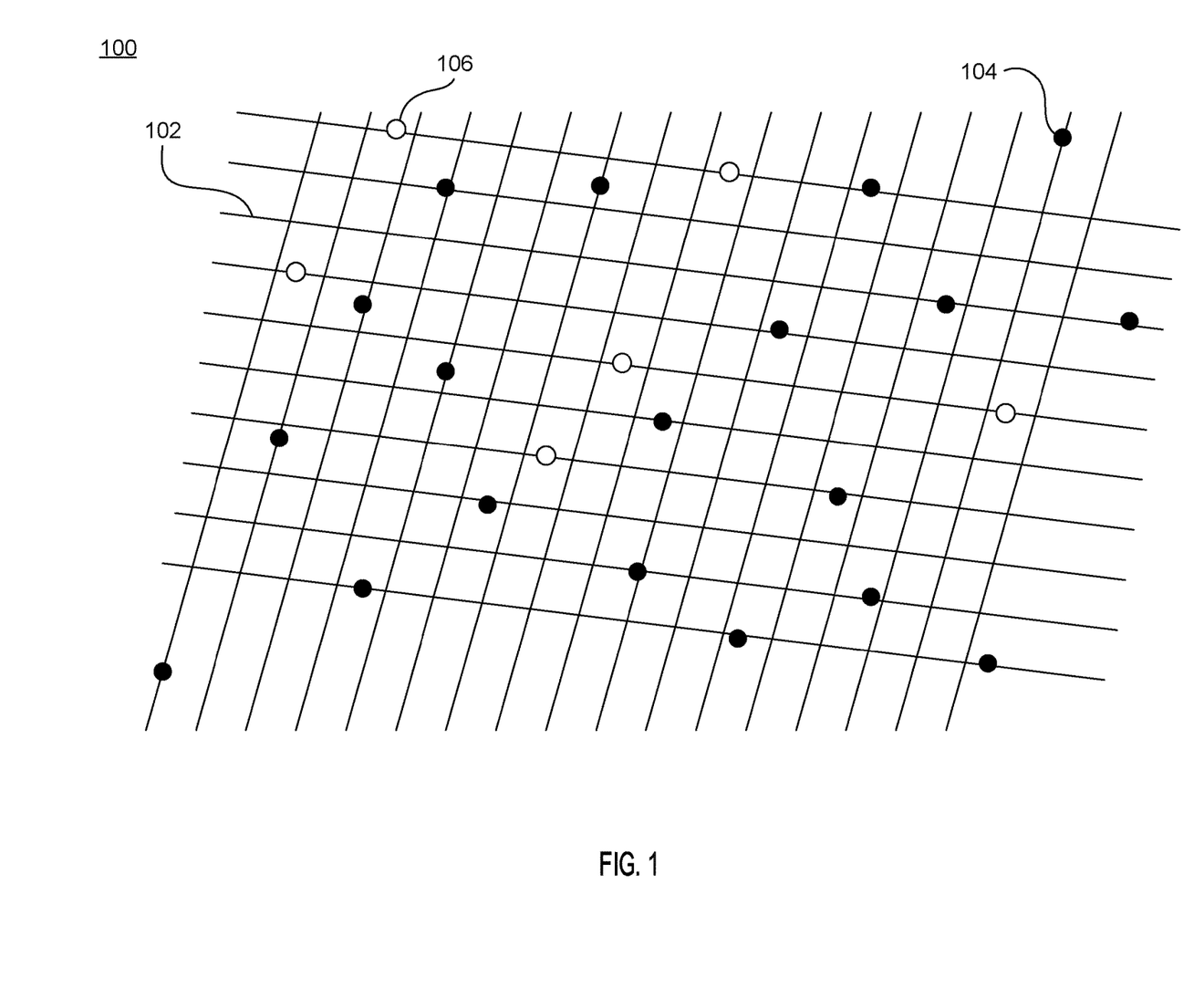
FIG. 1 illustrates a simulated environment having a fleet of autonomous vehicles traversing the simulated environment.

FIG. 1 illustrates a simulated environment 100 having a fleet of autonomous vehicles 102 traversing streets 104 of the simulated environment. More specifically, the fleet of autonomous vehicles 102 may be a simulated fleet of simulated autonomous vehicles 102.

Simulated environment 100 can be a simulation of a real-world geographic region. For example, simulated environment 100 can be a simulation of the San Francisco region. More specifically, simulated environment 100 can have streets 104. In some embodiments, streets 104 may be reflective of streets in the real-world geographic region. Each street 104 can have specific attributes including, but not limited to, slope or grade (e.g., how flat or hilly the street is), traffic congestion, number of lanes, direction of lanes, construction, quality, etc.

Additionally, simulated environment 100 can have various waypoints 106 that autonomous vehicles 102 need to arrive to. Waypoints 106 can include, but are not limited to, pick-up locations, drop-off locations, charging facilities, maintenance and/or repair facilities, specified areas for data collection, etc. Moreover, some waypoints 106 may be linked together. For example, a pick-up location may be linked with a drop-off location, such that an autonomous vehicle 102 that reaches the pick-up location must also navigate to the drop-off location.

Figure 2:
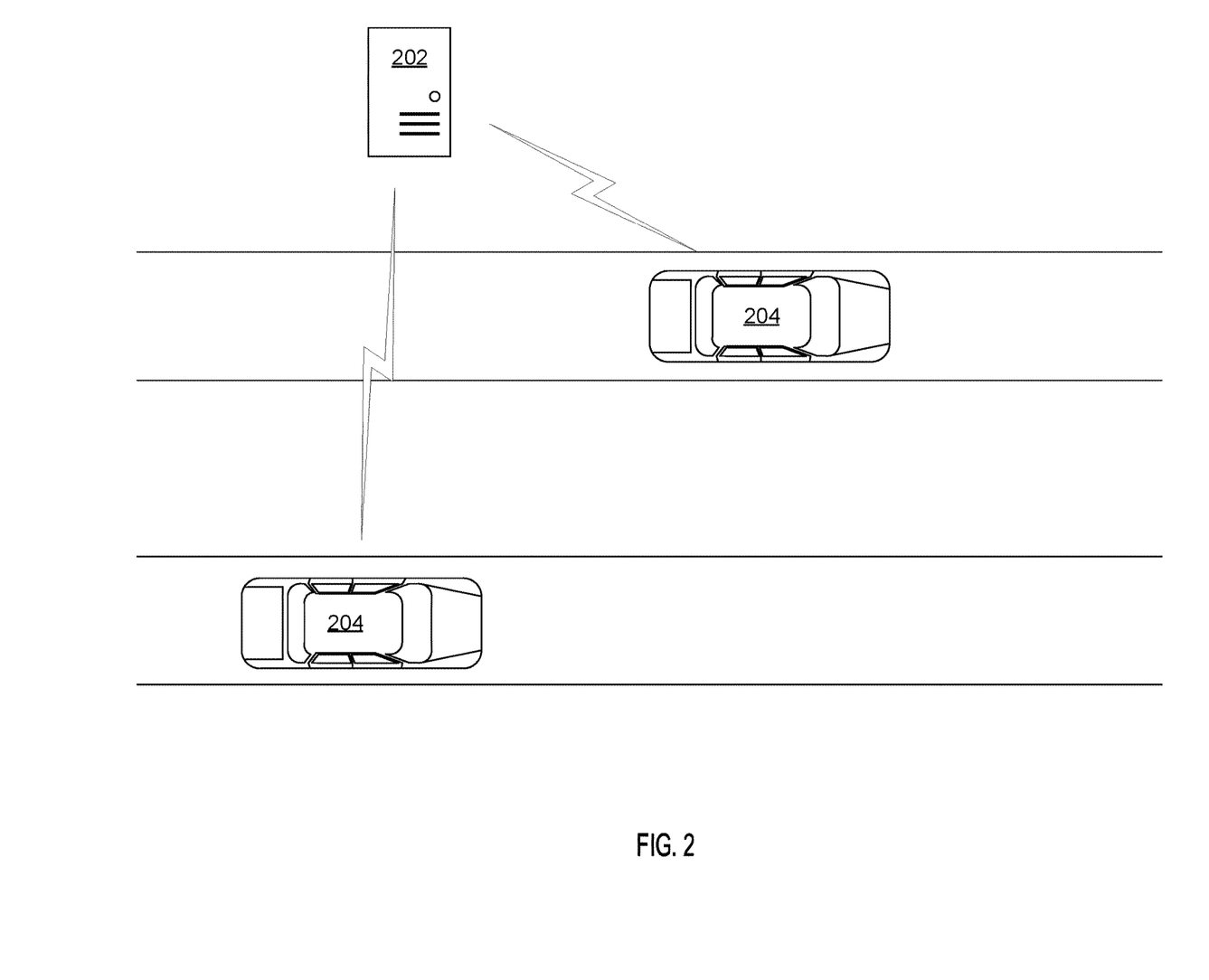
FIG. 2 illustrates a simulated environment having a fleet of autonomous vehicles in communication with a server.

FIG. 2 illustrates a simulated environment 200 having a server 202 simulating a plurality of autonomous vehicles 204. In other words, server 202 can simulate simulated environment 200 with a plurality of autonomous vehicles 204 therein. As server 202 simulates simulated environment 200, server 202 can also simulate all or some subsystems of autonomous vehicles 204. For example, server 202 can simulate a routing subsystem and/or control service (e.g., control service 412) for autonomous vehicles 204 to reduce total computing power. Server 202 can also simulate different routing updates. For example, server 202 can simulate a first environment, in which a first plurality of autonomous vehicles utilizes a first routing firmware. Server 202 can then also simulate a second environment, in which a second plurality of autonomous vehicles utilizes a second routing firmware.

Routing firmware can include changes to how autonomous vehicles 204 choose to traverse streets of simulated environment 200. For example, the routing firmware can indicate a preference to traverse flatter streets without hills.

As the plurality of autonomous vehicles 204 navigate simulated environment 200, autonomous vehicles 204 can record synthetic sensor data. The synthetic sensor data can include, but is not limited to, power consumption and/or efficiency, degradation of vehicle parts (e.g., tires, axles, struts, etc.), average trip times, wait time for passenger pick-up, frequency of visits to charging and/or maintenance facilities, etc. Autonomous vehicles 204 can then send the synthetic sensor data back to server 202. In some embodiments, server 202 can directly determine the synthetic sensor data because server 202 can simulate autonomous vehicles 204. Additionally, in some embodiments, server 202 can determine synthetic sensor data in ticks. For example, server 202 can determine power consumption of individual vehicles and/or of the fleet in intervals (e.g., every minute, every hour, etc.).

Server 202 can then simulate again a simulated environment 200 and autonomous vehicles 204, such that autonomous vehicles 204 are uploaded with different routing updates. For example, a routing update may specify preferences to take streets with less changes in inclines and declines. Similarly, a routing update may specify different average speeds to adjust time between arriving at a red light and when the red light changes to a green light. Autonomous vehicles 204 can again record synthetic sensor data. Server 202 can analyze the synthetic sensor data to optimize for a given metric. For example, a metric that server 202 can analyze for can include, but is not limited to, power consumption and/or efficiency, degradation of vehicles parts, trip times, frequency of visits to charging and/or maintenance facilities, etc. Server 202 can then compare the metrics between each simulation and determine routing updates that improve the desired metric. In some embodiments, server 202 can input the synthetic sensor data and the metric into a machine-learning model to optimize for the given metric.

Additionally, server 202 can also simulate locations of different waypoints (e.g., locations of charging, maintenance, and/or repair facilities). Server 202 can then simulate different environments with different waypoints, collect synthetic sensor data, and compare to analyze the effects of different waypoint locations on fleet-wide metrics. For example, placing a charging facility along a high frequency route may increase efficiency by reducing additional power consumption of autonomous vehicles because the autonomous vehicles may not need to go out of the way to get to a charging facility. As another example, waypoints can be used to pre-position an autonomous vehicle for predicted pick-up locations. Server 202 can then simulate different environments with different pre-positioning waypoints and determine, based on synthetic sensor data, whether average wait times for pick-up has changed.

Server 202 can also generate heatmaps based on the synthetic sensor data. For example, the heatmaps may identify locations where autonomous vehicles are consuming more power. As another example, the heatmaps can identify areas that autonomous vehicles traverse through that result in changes to average trip times.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 3:
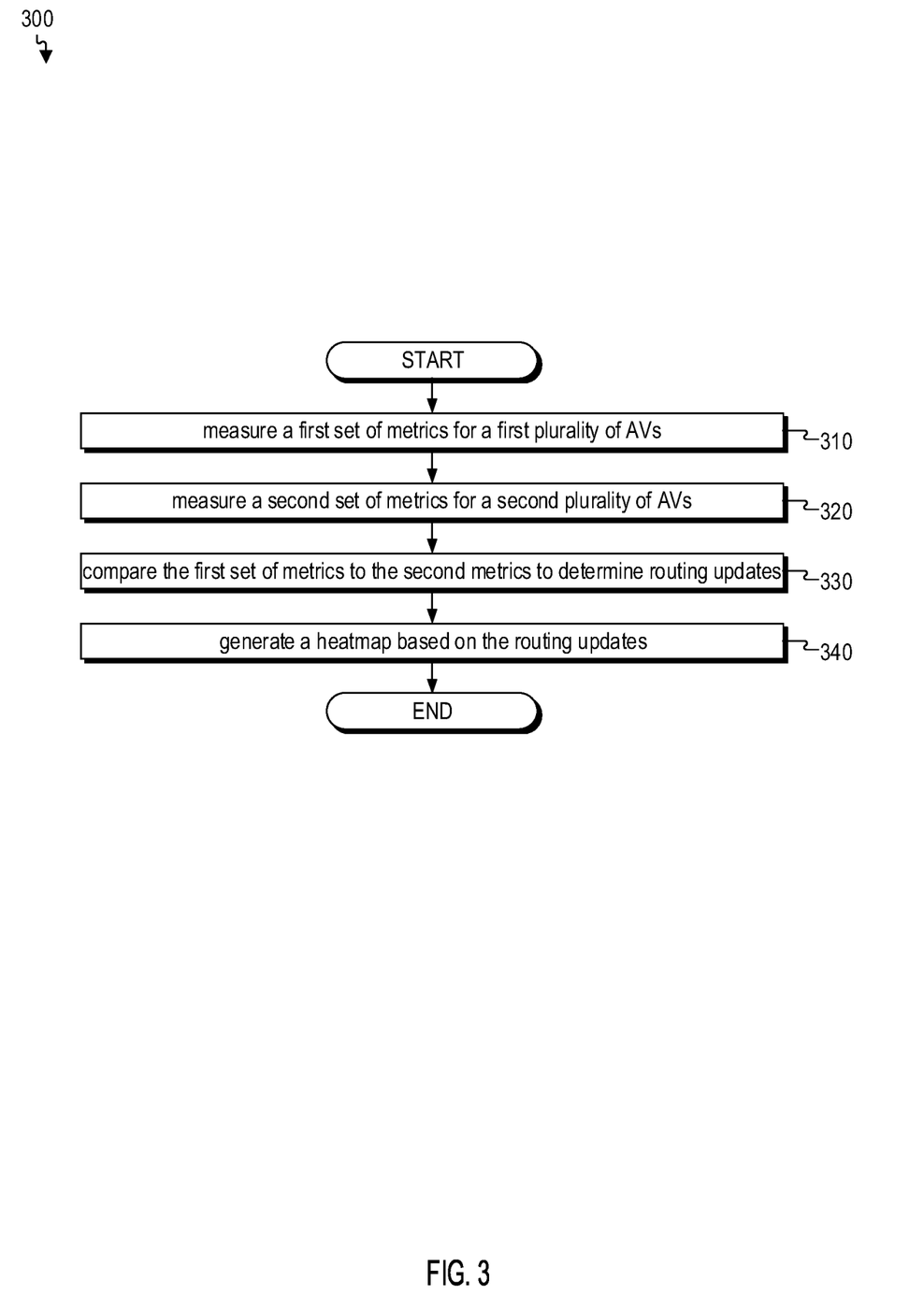
FIG. 3 is a flowchart of a method for simulating an autonomous vehicle fleet according to an example of the instant disclosure.

FIG. 3 illustrates an example method 300 for simulating autonomous vehicles at the fleet level to optimize fleet-wide performance. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

Method 300 includes measuring a first set of metrics for a first plurality of autonomous vehicles associated with a first vehicle routing version at step 310. For example, server 202 illustrated in FIG. 202 may measure a first set of cost metrics (e.g., power efficiency) for a first plurality of autonomous vehicles associated with a first vehicle route version. In some embodiments, the cost metrics can include, but are not limited to, energy consumption values for two or more of the first plurality of AVs, duty cycle metrics, a first set of locations for facilities. Measuring the first set of cost metrics for the first plurality of AVs and the second set of cost metrics for the second plurality of AVs includes simulating the first plurality of AVs and the second plurality of AVs.

Method 300 includes measuring a second set of metrics for a second plurality of AVs associated with a second vehicle routing version at step 320. For example, server 202 illustrated in FIG. 2 may measure a second set of cost metrics for a second plurality of AVs associated with a second vehicle route version. In some embodiments, the second set of cost metrics can include, but are not limited to, energy consumption values for two or more of the second plurality of AVs, a second set of locations for facilities, etc.

Method 300 includes comparing the first set of cost metrics with the second set of cost metrics to determine routing updates configured to reduce fleetwide energy consumption at step 330. For example, server 202 illustrated in FIG. 2 may compare the first set of cost metrics with the second set of cost metrics to determine routing updates configured to reduce fleetwide energy consumption. The routing updates are configured to make changes based on road grade. The routing updates are configured to make changes based on distance.

In some embodiments, method 300 includes generating a heatmap based on the routing updates at step 340. For example, server 202 illustrated in FIG. 2 may generate a heatmap based on the routing updates. More specifically, server 202 can identify locations based on synthetic sensor data of the autonomous vehicles. For example, when server 202 is optimizing for power consumption, the heatmap can identify locations associated with higher power consumption.

Figure 4:
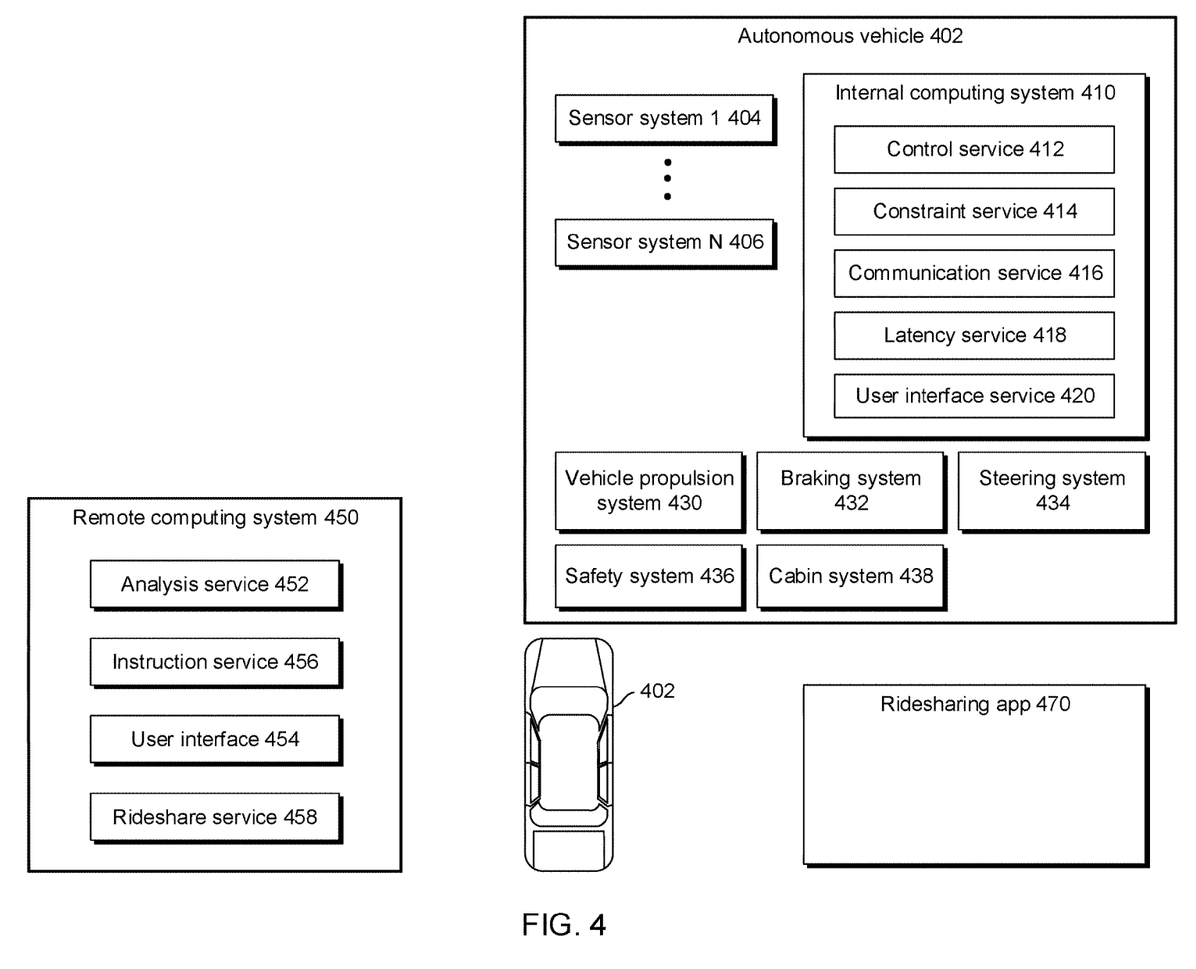
FIG. 4 illustrates environment that includes an autonomous vehicle in communication with a computing system.

FIG. 4 illustrates environment 400 that includes an autonomous vehicle 402 in communication with a computing system 450.

The autonomous vehicle 402 can navigate about roadways without a human driver based upon sensor signals output by sensor systems 404-406 of the autonomous vehicle 402. The autonomous vehicle 402 includes a plurality of sensor systems 404-406 (a first sensor system 402 through an Nth sensor system 404). The sensor systems 404-406 are of different types and are arranged about the autonomous vehicle 402. For example, the first sensor system 404 may be a camera sensor system and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

The autonomous vehicle 402 further includes a safety system 436 that can include various lights and signal indicators, parking brake, airbags, etc. The autonomous vehicle 402 further includes a cabin system 438 that can include cabin temperature control systems, in-cabin entertainment systems, etc.

The autonomous vehicle 402 additionally comprises an internal computing system 410 that is in communication with the sensor systems 404-406 and the mechanical systems 430, 432, 434. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control operation of the vehicle propulsion system 406, the braking system 408, the steering system 410, the safety system 436, and the cabin system 438. The control service 412 receives sensor signals from the sensor systems 402-404 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 416 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 440 regarding reporting data for training and evaluating machine learning algorithms, requesting assistance from remoting computing system or a human operator via the remote computing system 450, software service updates, ridesharing pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402. Additionally, analysis service 452 can be configured to compare, analyze, and determine how metrics change across different simulations.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

The remote computing system 450 can also include an instruction service 456 for sending instructions regarding the operation of the autonomous vehicle 402. For example, in response to an output of the analysis service 452 or user interface service 454, instructions service 456 can prepare instructions to one or more services of the autonomous vehicle 402 or a co-pilot or passenger of the autonomous vehicle 402.

The remote computing system 450 can also include a rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc.

Figure 5:
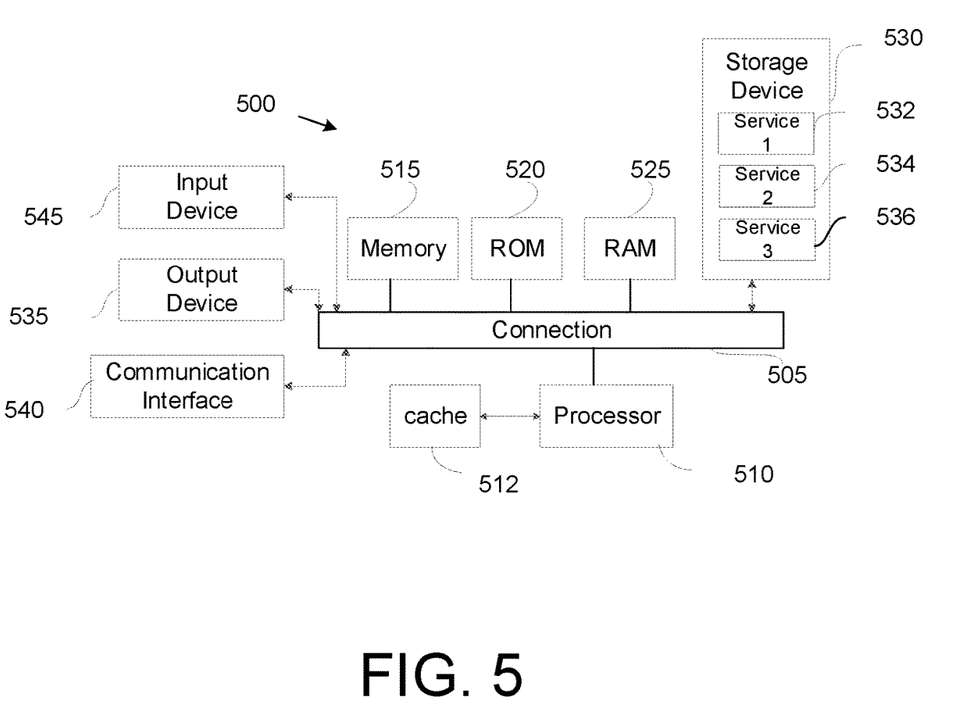
FIG. 5 shows an example of a system for implementing certain aspects of the present technology.

FIG. 5 shows an example of computing system 500, which can be for example any computing device making up server 202, internal computing system 410, remote computing system 450, and/or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative Examples of the Disclosure Include:

Aspect 1: A method comprising: measuring a first set of cost metrics for a first plurality of autonomous vehicles (AVs) associated with a first vehicle routing version, wherein the first set of cost metrics comprises energy consumption values for two or more of the first plurality of AVs; measuring a second set of cost metrics for a second plurality of AVs associated with a second vehicle routing version, wherein the second set of cost metrics comprises energy consumption values for two or more of the second plurality of AVs; and comparing the first set of cost metrics with the second set of cost metrics to determine routing updates configured to reduce fleetwide energy consumption.

Aspect 2: The method of Aspect 1, wherein the routing updates are configured to make changes based on road grade.

Aspect 3: The method of any of Aspects 1 to 2, wherein the routing updates are configured to make changes based on distance.

Aspect 4: The method of any of Aspects 1 to 3, wherein the cost metrics include duty cycle metrics.

Aspect 5: The method of any of Aspects 1 to 4, wherein measuring the first set of cost metrics for the first plurality of AVs and the second set of cost metrics for the second plurality of AVs includes simulating the first plurality of AVs and the second plurality of AVs.

Aspect 6: The method of any of Aspects 1 to 5, wherein the first set of cost metrics includes a first set of locations for facilities and the second set of cost metrics includes a second set of locations for facilities.

Aspect 7: The method of any of Aspects 1 to 6, further comprising: generating a heatmap based on the routing updates.

Aspect 8: A system comprising: a storage configured to store instructions; a processor configured to execute the instructions and cause the processor to: measure a first set of cost metrics for a first plurality of autonomous vehicles associated with a first vehicle route version, wherein the first set of cost metrics comprises energy consumption values for two or more of the first plurality of AVs, measure a second set of cost metrics for a second plurality of AVs associated with a second vehicle route version, wherein the second set of cost metrics comprises energy consumption values for two or more of the second plurality of AVs, and compare the first set of cost metrics with the second set of cost metrics to determine routing updates configured to reduce fleetwide energy consumption.

Aspect 9: The system of Aspect 8, wherein the routing updates are configured to make changes based on road grade.

Aspect 10: The system of any of Aspects 8 to 9, wherein the routing updates are configured to make changes based on distance.

Aspect 11: The system of any of Aspects 8 to 10, wherein the cost metrics include duty cycle metrics.

Aspect 12: The system of any of Aspects 8 to 11, wherein measuring the first set of cost metrics for the first plurality of AVs and the second set of cost metrics for the second plurality of AVs includes simulating the first plurality of AVs and the second plurality of AVs.

Aspect 13: The system of any of Aspects 8 to 12, wherein the first set of cost metrics includes a first set of locations for facilities and the second set of cost metrics includes a second set of locations for facilities.

Aspect 14: The system of any of Aspects 8 to 13, wherein the processor is configured to execute the instructions and cause the processor to: generate a heatmap based on the routing updates.

Aspect 15: A non-transitory computer readable medium comprising instructions, the instructions, when executed by a computing system, cause the computing system to: measure a first set of cost metrics for a first plurality of autonomous vehicles associated with a first vehicle route version, wherein the first set of cost metrics comprises energy consumption values for two or more of the first plurality of AVs; measure a second set of cost metrics for a second plurality of AVs associated with a second vehicle route version, wherein the second set of cost metrics comprises energy consumption values for two or more of the second plurality of AVs; and compare the first set of cost metrics with the second set of cost metrics to determine routing updates configured to reduce fleetwide energy consumption.

Aspect 16: The computer readable medium of Aspect 15, the routing updates are configured to make changes based on road grade.

Aspect 17: The computer readable medium of any of Aspects 15 to 16, the routing updates are configured to make changes based on distance.

Aspect 18: The computer readable medium of any of Aspects 15 to 17, the cost metrics include duty cycle metrics.

Aspect 19: The computer readable medium of any of Aspects 15 to 18, measuring the first set of cost metrics for the first plurality of AVs and the second set of cost metrics for the second plurality of AVs includes simulating the first plurality of AVs and the second plurality of AVs.

Aspect 20: The computer readable medium of any of Aspects 15 to 19, the first set of cost metrics includes a first set of locations for facilities and the second set of cost metrics includes a second set of locations for facilities.

What is claimed is:

1. A method comprising:
measuring a first set of cost metrics for a first plurality of autonomous vehicles (AVs) associated with a first vehicle routing version, wherein the first set of cost metrics comprises energy consumption values and degradation of vehicles parts values for a first plurality of AVs as the first plurality of AVs traverse a first route of an environment, and the first vehicle routing version specifies a preference to travel along streets with less changes in inclines and declines than a second vehicle routing version;
measuring a second set of cost metrics for a second plurality of AVs associated with the second vehicle routing version, wherein the second set of cost metrics comprises energy consumption values and degradation of vehicles parts values for a second plurality of AVs as the second plurality of AVs traverse a second route of the environment, and the second vehicle routing version specifies a preference to adjust an average speed of the second plurality of AVs to arrive at a red light when the red light changes to a green light;
comparing the first set of cost metrics with the second set of cost metrics to determine routing updates configured to reduce fleetwide energy consumption, generating an optimized heatmap using a machine learning model based on the routing updates that identifies locations with higher power consumption for an AV navigating within the environment, wherein the routing updates are configured to make changes based on road grade; and navigating the AV in accordance with the routing updates.

2. The method of claim 1, wherein the routing updates are configured to make changes based on distance.

3. The method of claim 1, wherein the first and second set of cost metrics include duty cycle metrics.

4. The method of claim 1, wherein measuring the first set of cost metrics for the first plurality of AVs and the second set of cost metrics for the second plurality of AVs includes simulating the first plurality of AVs and the second plurality of AVs.

5. The method of claim 1, wherein the first set of cost metrics includes a first set of locations for facilities and the second set of cost metrics includes a second set of locations for facilities.

6. A system comprising:
a storage configured to store instructions;
a processor configured to execute the instructions and cause the processor to:
measure a first set of cost metrics for a first plurality of autonomous vehicles (AVs) associated with a first vehicle route version, wherein the first set of cost metrics comprises energy consumption values and degradation of vehicles parts values for a first plurality of AVs as the first plurality of AVs traverse a first route of an environment, and the first vehicle routing version specifies a preference to travel along streets with less changes in inclines and declines than a second vehicle routing version;
measure a second set of cost metrics for a second plurality of AVs associated with the second vehicle route version, wherein the second set of cost metrics comprises energy consumption values and degradation of vehicles parts values for a second plurality of AVs as the second plurality of AVs traverse a second route of the environment, and the second vehicle routing version specifies a preference to adjust an average speed of the second plurality of AVs to arrive at a red light when the red light changes to a green light;
compare the first set of cost metrics with the second set of cost metrics to determine routing updates configured to reduce fleetwide energy consumption;
generate an optimized heatmap using a machine learning model based on the routing updates that identifies locations with higher power consumption for an AV navigating within the environment, wherein the routing updates are configured to make changes based on road grade; and
navigate the AV in accordance with the routing updates.

7. The system of claim 6, wherein the routing updates are configured to make changes based on distance.

8. The system of claim 6, wherein the first and second set of cost metrics include duty cycle metrics.

9. The system of claim 6, wherein measuring the first set of cost metrics for the first plurality of AVs and the second set of cost metrics for the second plurality of AVs includes simulating the first plurality of AVs and the second plurality of AVs.

10. The system of claim 6, wherein the first set of cost metrics includes a first set of locations for facilities and the second set of cost metrics includes a second set of locations for facilities.

11. A non-transitory computer readable medium comprising instructions, the instructions, when executed by a computing system, cause the computing system to:
measure a first set of cost metrics for a first plurality of autonomous vehicles (AVs) associated with a first vehicle route version, wherein the first set of cost metrics comprises energy consumption values and degradation of vehicles parts values for a first plurality of AVs as the first plurality of AVs traverse a first route of an environment, and the first vehicle routing version specifies a preference to travel along flatter streets than a second vehicle routing version;
measure a second set of cost metrics for a second plurality of AVs associated with the second vehicle route version, wherein the second set of cost metrics comprises energy consumption values and degradation of vehicles parts values for a second plurality of AVs as the second plurality of AVs traverse a second route of the environment, and the second vehicle routing version specifies a preference to adjust an average speed of the second plurality of AVs to arrive at a red light when the red light changes to a green light;
compare the first set of cost metrics with the second set of cost metrics to determine routing updates configured to reduce fleetwide energy consumption, generate an optimized heatmap using a machine learning model based on the routing updates that identifies locations with higher power consumption for an AV navigating within the environment, wherein the routing updates are configured to make changes based on road grade; and
navigate the AV in accordance with the routing updates.

12. The computer readable medium of claim 11, the routing updates are configured to make changes based on distance.

13. The computer readable medium of claim 11, the first and second set of cost metrics include duty cycle metrics.

14. The computer readable medium of claim 11, measuring the first set of cost metrics for the first plurality of AVs and the second set of cost metrics for the second plurality of AVs includes simulating the first plurality of AVs and the second plurality of AVs.

15. The computer readable medium of claim 11, the first set of cost metrics includes a first set of locations for facilities and the second set of cost metrics includes a second set of locations for facilities.

* * * * *